US010839786B1

(12) United States Patent
Hera et al.

(10) Patent No.: US 10,839,786 B1
(45) Date of Patent: Nov. 17, 2020

(54) SYSTEMS AND METHODS FOR CANCELING ROAD NOISE IN A MICROPHONE SIGNAL

(71) Applicant: Bose Corporation, Framingham, MA (US)

(72) Inventors: Cristian M. Hera, Lancaster, MA (US); Elie Bou Daher, Marlborough, MA (US); Vigneish Kathavarayan, Marlborough, MA (US); Ankita D. Jain, Westborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/443,248

(22) Filed: Jun. 17, 2019

(51) Int. Cl.
| | |
|---|---|
| *G10K 11/178* | (2006.01) |
| *G01P 15/08* | (2006.01) |
| *H04R 5/04* | (2006.01) |
| *H04S 7/00* | (2006.01) |

(52) U.S. Cl.
CPC ........ *G10K 11/17854* (2018.01); *G01P 15/08* (2013.01); *H04R 5/04* (2013.01); *H04S 7/301* (2013.01); *G01P 2015/0882* (2013.01); *G10K 2210/12821* (2013.01); *H04R 2499/13* (2013.01)

(58) Field of Classification Search
CPC .... G10K 11/17854; G10K 2210/12821; G10P 15/08; G10P 2015/0882; H04R 5/04; H04R 2499/13; H04S 7/301
See application file for complete search history.

(56) References Cited

U.S. PATENT DOCUMENTS

| | | | | |
|---|---|---|---|---|
| 2008/0240457 | A1* | 10/2008 | Inoue | G10K 11/178 |
| | | | | 381/71.4 |
| 2017/0032806 | A1* | 2/2017 | Konjeti | G10L 15/20 |
| 2018/0047383 | A1* | 2/2018 | Hera | H04R 29/001 |
| 2020/0074976 | A1* | 3/2020 | Torres | G10K 11/17853 |

* cited by examiner

*Primary Examiner* — Regina N Holder
(74) *Attorney, Agent, or Firm* — Bond, Schoeneck & King, PLLC

(57) ABSTRACT

An audio system including an accelerometer positioned to produce an accelerometer signal representative of road noise within a vehicle cabin; a microphone operably positioned within the vehicle to receive the road noise and to produce a microphone signal having a road-noise component; and a cabin road-noise canceler, comprising a cabin road-noise cancellation filter, configured to receive the accelerometer signal and to produce a cabin road-noise cancellation signal, wherein the cabin road-noise cancellation signal is provided to an acoustic transducer for transduction of an acoustic road-noise cancellation signal, the acoustic road-noise cancellation signal minimizing the road noise within at least one cancellation zone in the vehicle cabin; a microphone road-noise canceler, comprising a microphone road-noise cancellation filter, configured to receive the cabin road-noise signal and the microphone signal and to minimize the road-noise component of the microphone signal according to the cabin road-noise cancellation signal, to produce an estimated microphone signal.

20 Claims, 5 Drawing Sheets

SYSTEMS AND METHODS FOR CANCELING ROAD NOISE IN A MICROPHONE SIGNAL

BACKGROUND

The present disclosure generally relates to systems and methods for road-noise cancellation in a microphone signal, and specifically to systems and methods for road-cancellation in a microphone signal, according to road-noise signal generated by a cabin road-noise cancellation system.

SUMMARY

All examples and features mentioned below can be combined in any technically possible way.

According to an aspect, an audio system includes: an accelerometer positioned to produce an accelerometer signal representative of road noise within a vehicle cabin; a microphone operably positioned within the vehicle cabin to receive the road noise and to produce a microphone signal having a road-noise component; and a cabin road-noise canceler, comprising a cabin road-noise cancellation filter, configured to receive the accelerometer signal and to produce a cabin road-noise cancellation signal, wherein the cabin road-noise cancellation signal is provided to an acoustic transducer for transduction of an acoustic road-noise cancellation signal, the acoustic road-noise cancellation signal minimizing the road noise within at least one cancellation zone in the vehicle cabin; a microphone road-noise canceler, comprising a microphone road-noise cancellation filter, configured to receive the cabin road-noise cancellation signal and the microphone signal and to minimize the road-noise component of the microphone signal according to the cabin road-noise cancellation signal, to produce an estimated microphone signal.

In an example, the microphone road-noise cancellation filter is configured to provide an estimated road-noise signal, based on the cabin road-noise cancellation signal, wherein the microphone road-noise canceler is configured to subtract the estimated road-noise signal from the microphone signal, such that the road-noise component of the microphone signal is minimized.

In an example, the microphone road-noise cancellation filter is a fixed filter.

In an example, the microphone road-noise cancellation filter is an adaptive filter, wherein a plurality of coefficients of the adaptive filter are adapted to according to an error signal.

In an example, the audio system further includes an echo-cancellation filter configured to minimize an echo component of the microphone signal, resulting from an acoustic production of at least one acoustic transducer disposed within the vehicle cabin, to produce a residual signal.

In an example, the adaptive filter is included in a multichannel adaptive filter further comprising an echo-cancellation filter configured to minimize an echo component of the microphone signal resulting from an acoustic production of at least one acoustic transducer disposed within the vehicle cabin.

In an example, the microphone road-noise cancellation filter is configured to receive the microphone signal and the cabin road-noise cancellation signal, the microphone road-noise cancellation filter being optimized to minimize the road-noise component of the microphone signal according to the cabin road-noise cancellation signal and the microphone signal.

According to another aspect, a method for canceling road noise in a microphone signal includes receiving from a cabin road-noise canceler a cabin road-noise cancellation signal configured to minimize road noise within at least one cancellation zone in a vehicle cabin; receiving, from a microphone operably positioned within the vehicle cabin, a microphone signal having a road-noise component; and minimizing, with a microphone road-noise cancellation filter, the road-noise component of the microphone signal according to the cabin road-noise cancellation signal, to produce an estimated microphone signal.

In an example, the step of minimizing comprises: generating, with the microphone road-noise cancellation filter, an estimated road-noise signal, based on the cabin road-noise cancellation signal, subtracting the estimated road-noise signal from the microphone signal, such that the road-noise component of the microphone signal is minimized.

In an example, the microphone road-noise cancellation filter is a fixed filter.

In an example, the microphone road-noise cancellation filter is an adaptive filter, wherein a plurality of coefficients of the adaptive filter are adapted to according to an error signal.

In an example, the method further includes minimizing, with an echo-cancellation filter, an echo component of the microphone signal, resulting from an acoustic production of at least one acoustic transducer disposed within the vehicle cabin, to produce a residual signal.

In an example, the method further includes minimizing, with an echo-cancellation filter being included together with the adaptive filter in a multichannel adaptive filter, an echo component of the microphone signal resulting from an acoustic production of at least one acoustic transducer disposed within the vehicle cabin.

In an example, the step of minimizing the road-noise component of the microphone signal is performed according to both the road-noise signal and the microphone signal.

According to another aspect, a non-transitory storage medium comprising program code that, when executed by a processor, performs the steps of: receiving from a cabin road-noise canceler a cabin road-noise cancellation signal configured to minimize road noise within at least one cancellation zone in a vehicle cabin; receiving, from a microphone operably positioned within the vehicle cabin, a microphone signal having a road-noise component; and minimizing, with a microphone road-noise cancellation filter, the road-noise component of the microphone signal according to the cabin road-noise cancellation signal, to produce an estimated microphone signal.

In an example, the step of minimizing comprises: generating, with the microphone road-noise cancellation filter, an estimated road-noise signal, based on the cabin road-noise cancellation signal, subtracting the estimated road-noise signal from the microphone signal, such that the road-noise component of the microphone signal is minimized.

In an example, the microphone road-noise cancellation filter is a fixed filter.

In an example, the microphone road-noise cancellation filter is an adaptive filter, wherein a plurality of coefficients of the adaptive filter are adapted according to an error signal.

In an example, further program code further includes minimizing, with an echo-cancellation filter, an echo component of the microphone signal, resulting from an acoustic production of at least one acoustic transducer disposed within the vehicle cabin, to produce a residual signal.

In an example, further program code further includes minimizing, with an echo-cancellation filter being included together with the adaptive filter in a multichannel adaptive filter, an echo component of the microphone signal resulting from an acoustic production of at least one acoustic transducer disposed within the vehicle cabin.

The details of one or more implementations are set forth in the accompanying drawings and the description below. Other features, objects, and advantages will be apparent from the description and the drawings, and from the claims.

DETAILED DESCRIPTION

Figure 1A:
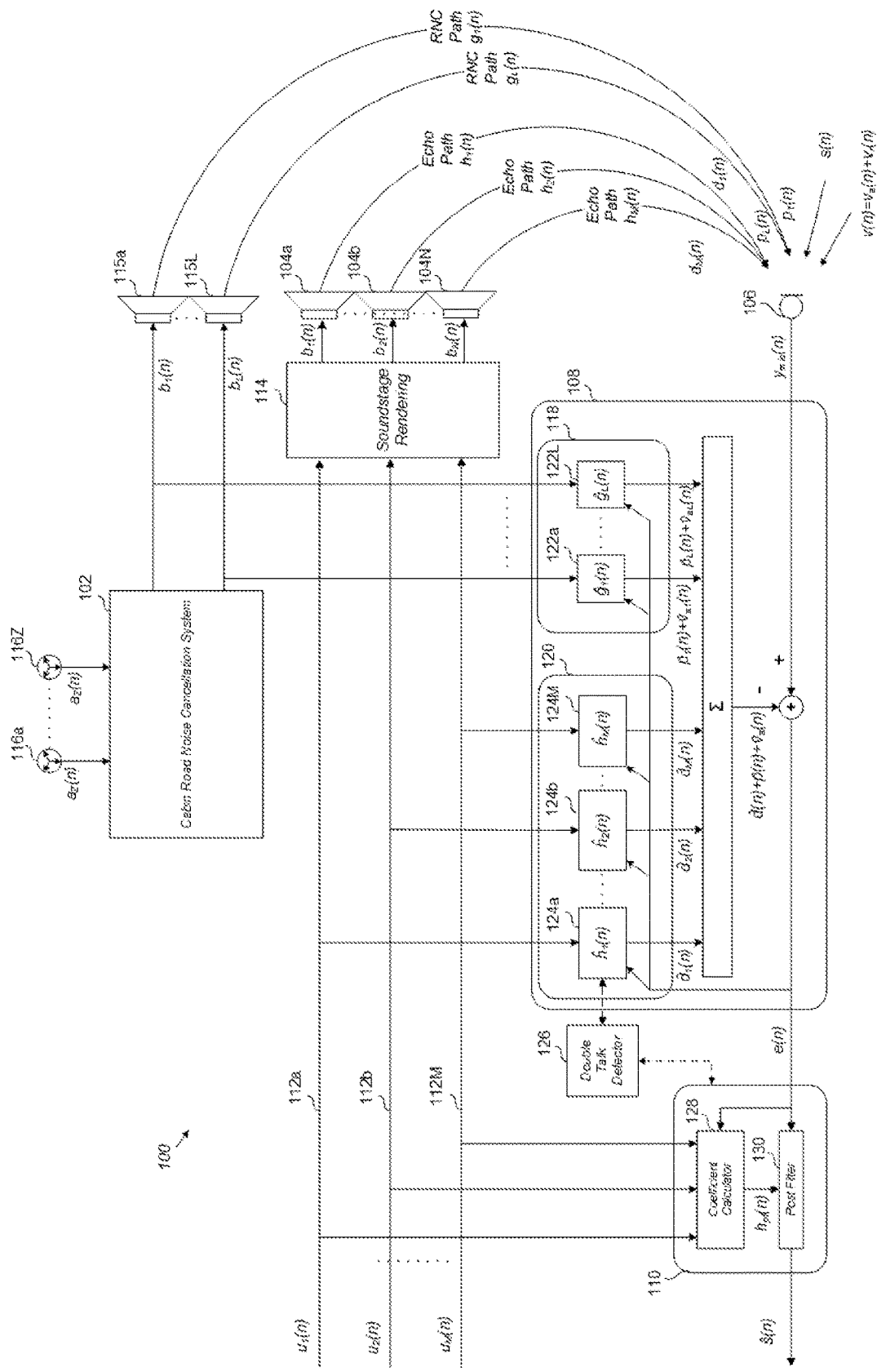
FIG. 1A depicts a schematic of an audio system including a microphone road-noise canceler for canceling road noise in a microphone signal, according to an example.

A handsfree phone system, implemented in a vehicle, will include a microphone positioned within the vehicle to receive the user's voice. The microphone signal is then typically routed to a mobile device for transmission. Because the microphone is located within the vehicle cabin, road noise resulting from vibrations of the vehicle structure will be present and detectable within the microphone signal. Road noise in the microphone signal will be audible to a user receiving the call and will generally degrade the quality of the call. Accordingly, there exists a need in the art for a method of minimizing the presence of road noise in the microphone signal sent to a handsfree phone system.

Various examples described herein are directed to systems and methods for minimizing the presence of road noise in the microphone signal by utilizing road noise cancellation signals received from a road noise cancellation system configured to minimize road noise in the vehicle cabin. FIG. 1 illustrates an example an audio system 100 and a cabin road noise cancellation system 102, implemented in a vehicle. Audio system 100 may include one or more acoustic transducers 104, one or more microphones 106, and one or more audio processing subsystems, such as multichannel adaptive filter 108 and post filter subsystem 110. The audio system 100 receives one or more content signals u(n), over one or more channels 112. The program content signals u(n) may be a single type of content signal, such as a voice signal, presented over multiple channels 112 as, for example, a left and right pair. Alternatively, or in combination, multiple types of program content signals, such as voice, navigation, or music, may each be presented over one or more channels 112. The program content signals u(n) may be analog or digital signals and may be provided as compressed and/or packetized streams, and additional information may be received as part of such a stream, such as instructions, commands, or parameters from another system for control and/or configuration of the processing components such as soundstage rendering 114, the multichannel adaptive filter 108 or other components.

The block diagrams illustrated in the figures, such as the example audio system 100 and cabin road-noise cancellation system 102 of FIG. 1, are schematic representations and not necessarily illustrative of individual hardware elements. For instance, in some examples, each of the multichannel adaptive filter 108, the post filter subsystem 110, and the soundstage rendering 114 and other components and/or any portions or combinations of these, may be implemented in one set of circuitry, such as a digital signal processor, a controller, or other logic circuitry, and may include non-transitory storage medium storing instructions for the circuitry to perform the functions described herein. In an alternative example, various portions or combinations of these may be distributed across various sets of circuitry.

The content signals are converted into an acoustic signal by the one or more acoustic transducers 104. The acoustic transducers(s) 104 may have further processing components, such as soundstage rendering 114, which provides various processing, such as equalization and loudspeaker routing, to drive the acoustic transducer(s) 104, in order to generate acoustic sound fields in accordance with the various content signals and soundstage parameters. In an example, one or more acoustic transducers 104 may be disposed within the vehicle cabin, each of the acoustic transducer(s) 104 being located within a respective door of the vehicle and configured to project sound into the vehicle cabin. Alternatively, or additionally, acoustic transducer(s) 104 may be located within a headrest, or elsewhere in the vehicle cabin.

Running concurrently with audio system 100, cabin road-noise cancellation system 102 may be configured to generate road-noise cancellation signals b(n) that, when transduced by acoustic transducer(s) 115, destructively interferes with road noise in at least one cancellation zone within the vehicle cabin. The acoustic road-noise cancellation signal, produced as a result of road-noise cancellation signal b(n), is approximately 180° out of phase with—and thus destructively interferes with—the undesired sound within the cancellation zone. The cancellation zone may, e.g., be located about a passenger's head, such that the passenger perceives less road noise. (The argument n, in this disclosure, is representative of a discrete-time signal.)

The road-noise cancellation signals b(n) may be based, at least in part, on accelerometer signals a(n), representative of road noise, received from one or more accelerometers 116. Accelerometer(s) 116 may be mounted to and configured to detect vibrations transmitted through a vehicle structure. Vibrations transmitted through the vehicle structure are transduced by the structure into road noise in the vehicle cabin. "Accelerometer," as used herein, should be understood to encompass any sensor suitable for detecting vibrations in the vehicle structure resulting from the travel of the vehicle across a road or other surface or resulting from the vibration of the engine, which are transduced into a sound within a vehicle cabin.

Like acoustic transducer(s) 104, acoustic transducer(s) 115 may, for example, be speakers distributed in discrete locations about the perimeter of the vehicle cabin. In an example, acoustic transducer(s) 115 may be the same as acoustic transducer(s) 104. In other words, one set of acoustic transducers, or a subset of acoustic transducers, may be shared between the audio system 100 and cabin road-noise cancellation system 102, producing both of the program content signals u(n) and road-noise cancellation signals b(n). Cabin road-noise cancellation system 102 is described in more detail in connection with FIG. 2, below.

A microphone, such as the microphone 106, may receive each of: an acoustic voice signal s(n) from a user, a noise signal v(n), an acoustic echo signal d(n), the acoustic road-noise cancellation signal p(n), and other acoustic signals such as background noise within the vehicle. The microphone 106 generally converts acoustic signals into, e.g., electrical signals, and provides them to the multichannel adaptive filter 108, which includes microphone road-noise canceler 118 and echo canceler 120. Specifically, microphone 106 provides a microphone signal $y_{mic}(n)$ including voice signal s(n), when a user is speaking, a noise signal v(n), an echo signal d(n), (i.e., the component of the combined signal y(n) that results from the acoustic production of the acoustic transducer(s) 104) when acoustic transducers 104 are active, as part of a combined signal to the multichannel adaptive filter 108. The noise signal v(n), will include, at least, components related to the road noise, $v_a(n)$ (i.e., the acoustic signals within the vehicle cabin that result from the structure of the vehicle vibrating as the vehicle travels over a road or other surface, or resulting from the vibrations of the engine) and wind noise, $v_r(n)$ (i.e., the acoustic signals within the vehicle cabin that result from air passing over the vehicle as the vehicle travels).

In some examples, the microphone 106 may be an array of microphones, having array processing to, e.g., steer beams toward sources of desired acoustic signals and/or away from noise sources, and may additionally or alternately steer nulls toward noise sources. Alternatively, or additionally, any processing associated with microphone(s) 106 may virtually project the microphone(s) 106 at a location near the user's mouth.

As described above, the acoustic road-noise cancellation signal will cancel road noise within at least one cancellation zone. Thus, within the cancellation zone, the presence of both the road noise $v_a(n)$ and the acoustic road-noise cancellation signal will be limited. However, outside of cancellation zone, at the microphone(s) 106, the acoustic road-noise cancellation signal p(n) will likely not be shifted 180° with respect to the road noise, but will instead be shifted at some other angle, such as 120° with respect to the road noise. As a result, the road noise $v_a(n)$ and the acoustic road-noise cancellation signal p(n) will cancel to some degree less than in the cancellation zone. Accordingly, if microphone(s) 106 is positioned at some location outside of the cancellation zone, microphone signal $y_{mic}(n)$ will further include components related to both the road noise component $v_a(n)$ and the acoustic road-noise cancellation signal p(n).

Multichannel adaptive filter 108 functions to attempt to remove the echo signal d(n), the road-noise component $v_a(n)$, and the acoustic road-noise cancellation signal p(n) from the combined signal $y_{mic}(n)$. In an example, the multichannel adaptive filter 108 may operate to remove the road-noise component $v_a(n)$ and the road-noise cancellation signal component p(n) from the combined signal $y_{mic}(n)$ by processing the road-noise signal through microphone road-noise canceler 118, comprising at least one microphone road-noise cancellation filter 122, to produce an estimated road-noise cancellation signal $\hat{p}(n)$ and estimated road-noise signal $\hat{v}_a(n)$, which is subtracted from the signal provided by the microphone 106. Likewise, the multichannel filter may operate to remove the echo signal d(n) by processing the program content signal u(n) through an echo canceler 120, comprising one or more echo-cancellation filters 124, to produce an estimated echo signal $\hat{d}(n)$, which is subtracted from the signal provided by the microphone 106.

As shown, each microphone road-noise cancellation filter 122 may be associated with a particular road-noise cancellation signal b(n) output to one or more acoustic transducer(s) 115. The road-noise cancellation signal b(n) is phase-shifted with respect to, and is thus correlated with, both the road noise component $v_a(n)$ and the road-noise cancellation signal component p(n) of the combined signal $y_{mic}(n)$ provided by the microphone 106. Accordingly, the microphone road-noise cancellation filters 122, being provided the road-noise cancellation signal b(n) as a reference signal, will produce an estimate of both the road-noise cancellation signal p(n) and the road noise $v_a(n)$, which is then subtracted from the microphone signal $y_{mic}(n)$.

Similarly, each echo-cancellation filter 124 may be associated with a particular content channel u(n). Accordingly, each echo-cancellation filter 124 receives a particular content channel u(n) as a reference signal to produce the estimated program content signal $\hat{d}(n)$ to be subtracted from the microphone signal. In various alternative embodiments, the output of soundstage rendering 114, b(n), rather than program content signals u(n), may be used as the reference signal(s) for echo canceler 120. Indeed, any signal, correlated with at least one the program content signals u(n) and suitable for minimizing the presence the echo signal d(n) in the combined microphone signal $y_{mic}(n)$, may be used as a reference signal for echo canceler 120.

Thus, the multichannel adaptive filter 108, if performing well, will function to substantially remove the road noise component $v_a(n)$, the road-noise cancellation component p(n), and the echo signal component d(n) from the combined microphone signal, yielding a residual signal e(n) that will be a good representation of the actual voice signal.

The multichannel adaptive filter 108 may include an adaptive algorithm to update the microphone road-noise cancellation filter(s) 122 and the echo cancellation filter(s) 124, at intervals, to improve the estimated echo signal $\hat{d}(n)$, estimated road-noise cancellation signal $\hat{p}(n)$, and the estimated road noise signal $\hat{v}_a(n)$. Over time, the adaptive algorithm causes the multichannel adaptive filter 108 to converge on satisfactory parameters that produce a sufficiently estimated echo signal $\hat{d}(n)$, estimated road-noise cancellation signal $\hat{p}(n)$, and the estimated road noise signal $\hat{v}_a(n)$. Generally, the adaptive algorithm updates the microphone road-noise cancellation filter(s) 122 and the echo cancellation filter(s) 124 during times when the user is not speaking, but in some examples the adaptive algorithm may make updates at any time. When the user speaks, such is deemed "double talk," and the microphone(s) 106 picks up both the acoustic echo signal d(m) and the acoustic voice signal from the user. Double talk may be detected by a double-talk detector 126, according to any suitable method.

The microphone road-noise cancellation filter(s) 122 may each apply a respective set of filter coefficients to the road-noise cancellation signal b(n) to produce the combined estimated road-noise cancellation signal $\hat{p}(n)$ and estimated road-noise signal $\hat{v}_a(n)$. Similarly, echo-cancellation filters 124 may each apply a respective set of filter coefficients to the program content signal u(n) to produce the estimated echo signal $\hat{d}(n)$. The adaptive algorithm may use any of various techniques to determine the filter coefficients and to update, or change, the filter coefficients to improve performance of the microphone road-noise cancellation filter(s) 122 and echo-cancellation filters 124. Such adaptive algorithms, whether operating on an active filter or a background filter, may include, for example, a least mean squares (LMS)

algorithm, a normalized least mean squares (NLMS) algorithm, a recursive least square (RLS) algorithm, or any combination or variation of these or other algorithms.

The microphone road-noise cancellation filter(s) 122, as adapted by the adaptive algorithm, converge to apply an estimated transfer function ĝ(n), which is representative of the transfer function g(n) between acoustic transducer(s) 115 and microphone 106, and the transfer function between the vehicle structure and microphone 106, multiplied by the inverse of the cabin road-noise cancellation filter transfer function (e.g., the transfer function of cabin road-noise cancellation filter 202 described in connection with FIG. 3, below). This may be demonstrated according to equations (1)-(6), below. In the frequency domain, a single road-noise cancellation signal b(n), with respect to single accelerometer 116 input signal a(n), can be expressed as follows:

$$B(k) = A(k) \cdot W(k) \quad (1)$$

where A(k) is the accelerometer signal in frequency domain, and W(k) is the transfer function of the fixed or adaptive filter (e.g., cabin road-noise cancellation filter 202) which converts the accelerometer signal a(n) to a road noise cancellation signal b(n) to be played by the acoustic transducer 115 to cancel the noise at in the cancellation zone (e.g., at the user's ear). W(k) is usually representative of the vehicle structure between the accelerometer and the occupant $T_{au}$, as well as the inverse of the acoustic path between the speaker and the occupant $T_{su}$. The previous equation can be rearranged as follows:

$$A(k) = B(k) \cdot W^{-1}(k) \quad (2)$$

The combined road noise and cancellation noise signal at the microphone can be expressed as follows:

$$V(k) = V_a(k) + P(k) = A(k) \cdot T_{am}(k) + B(k) \cdot T_{sm}(k), \quad (3)$$

where $V_a(k)$ is the road noise at the microphone, P(k) is the cancellation signal at the microphone, $T_{am}$ is the transfer function between the accelerometer and the microphone, and $T_{sm}$ is the transfer function between the speaker and the microphone. Substituting A(k) with $B(k) \cdot W^{-1}(k)$, V(k) can be rewritten as:

$$V(k) = B(k) \cdot W^{-1}(k) \cdot T_{am}(k) + B(k) \cdot T_{sm}(k) \quad (4)$$

Factoring out B(k), V(k) may again be rewritten as:

$$V(k) = B(k) \cdot [W^{-1}(k) \cdot T_{am}(k) + T_{sm}(k)] = B(k) \cdot G(k) \quad (5)$$

The noise cancellation adaptive filter tries to estimate the transfer function G(k).

$$G(k) = [W^{-1}(k) \cdot T_{am}(k) + T_{sm}(k)]. \quad (6)$$

Again, the second component $T_{sm}$ is representative of the acoustic path between the speaker and the microphone, and the first component includes the vehicle structure to microphone transfer function $T_{am}$. Equation (6) also includes the inverse of the filter that was applied to the accelerometer signal to generate the road noise cancellation signal. The transfer function g(n) is thus a representation of how the road-noise cancellation signal b(n) is transformed as an acoustic road-noise cancellation signal p(n) and how the road noise propagates through the vehicle cabin to microphone(s) 106. In addition, the estimated transfer function ĝ(n) may take into account the response of microphone(s) 106 and any processing associated with microphone(s) 106 that may alter the road-noise cancellation component p(n) of combined microphone signal $y_{mic}(n)$ prior to its receipt at multichannel adaptive filter 108.

It will be understood that the above equations relate to a single-input single-output audio system 100, using one accelerometer 116, one speaker 115, one microphone 106, and one occupant. However, it will also be understood that the above equations may be extended to cover multiple-input multiple-output examples of audio system 100.

Similarly, the echo-cancellation filter(s) 124, as adapted by the adaptive algorithm, converge to apply an estimated transfer function ĥ(n) which is representative of the response of the echo path between acoustic transducer(s) 104 and microphone(s) 106.

Generally, the number of echo-cancellation filters 124 will match the number of program content channels 112, each echo-cancellation filter 124 being associated with a particular program content signal 112, from which it receives a program content signal u(n) as a reference signal. For example, adaptive road-noise cancellation filter 124a is associated with and receives a signal $u_1(n)$ from program content channel 112a and may apply a respective transfer function $ĥ_1(n)$ representative of the echo path $h_1(n)$ (and the response of any additional processing, as will be described below). Likewise, the remaining adaptive echo-cancellation filters 124M each may be associated with and receive a signal(s) $u_M(n)$ from program content channel(s) 112M, and apply a respective transfer function(s) $ĥ_M(n)$. The respective transfer functions of each adaptive echo-cancellation filter 124 (and each microphone road-noise cancellation filter 122) is adjusted to minimize an error signal, shown here as road-noise and echo canceled, residual signal e(n).

It should be understood that the number of adaptive echo-cancellation filters 124 will be dependent, generally, on the number of reference signals received. Thus, if the program content signals u(n) are used as reference signals, some M number of echo-cancellation filters 124 may be implemented, each echo-cancellation filter 124 being respectively associated with one of M program content signals u(n) whereas, if the soundstage rendering output b(n), is used, some N number of echo cancellation filters 124 may be implemented, each echo-cancellation filter 124 being respectively associated with one of N soundstage rendering outputs b(n). It should also be understood that, in some examples, a fewer number of adaptive echo-cancellation filters 124 than, e.g., program content signals u(n) or soundstage rendering outputs b(n), may be used. For example, fewer echo-cancellation filters 124 may be used if certain program content signals u(n), such as a set of woofer left, twiddler left, and twitter left program content signals u(n), are summed together and provided as a reference signal to a single echo-cancellation filter 124, or if only a subset of reference signals need to be used to achieve effective echo cancellation.

In addition to estimating the echo path h(n), estimated transfer function ĥ(n) may represent an estimate of any processing disposed between the location from which the reference signals (e.g., program content signals u(n)) are taken and echo canceller 120. Thus, where, as shown in FIG. 1A, the reference signals are program content signals u(n), the estimated transfer function ĥ(n) will represent the response of soundstage rendering 114, acoustic transducer(s) 104, microphone(s) 106, and any processing (such as array processing) associated with microphone(s) 106, in addition to the response of the echo path h(n). The estimated transfer function h(n) is thus a representation of how the program content signal u(n) is transformed from its received form into the echo signal d(n), in conjunction with the response and any processing performed at microphone(s) 106. If, however, the reference signals are taken at the output of soundstage rendering 114, b(n), the estimated transfer function ĥ(n) will collectively represent the response of acoustic transducer(s) 104, echo path h(n), microphone(s) 106, and any processing associated with microphone(s) 106. Thus, although FIGS. 1 and 2 depict M estimated echo signals $\hat{d}(n)$ rather than N estimated echo signals $\hat{d}(n)$, because the response of soundstage rendering 114 is included in estimated transfer function $\hat{h}(n)$, each of estimated echo signals $\hat{d}(n)$ will include the processing of the associated program content signal u(n) by soundstage rendering 114. Accordingly, the sum of M estimated echo signals $\hat{d}(n)$ will estimate the sum of N echo signals d(n).

Similarly, although two road-noise cancellation signals b(n) are shown, it should be understood that, in various alternative examples, any number of road-cancellation signals b(n), including a single road-noise cancellation signal b(n), may be provided to any number of acoustic transducer(s) 115. Each microphone road-noise cancellation filter 122 will typically be associated with a particular road-noise cancellation signal.

In various examples, the multichannel adaptive filter 108 may include filters in addition to or instead of echo-cancellation filter(s) 124. For example, multichannel adaptive filter 108 may include additional microphone road-noise cancellation filters 122 that receive accelerometer signals a(n), rather than the road-noise cancellation signal b(n) as references. Furthermore, in various examples, the road-noise cancellation filters may be implemented without any additional filters. Thus, multichannel adaptive filter 108 may include only microphone road-noise cancellation filter(s) 122.

Figure 1B:
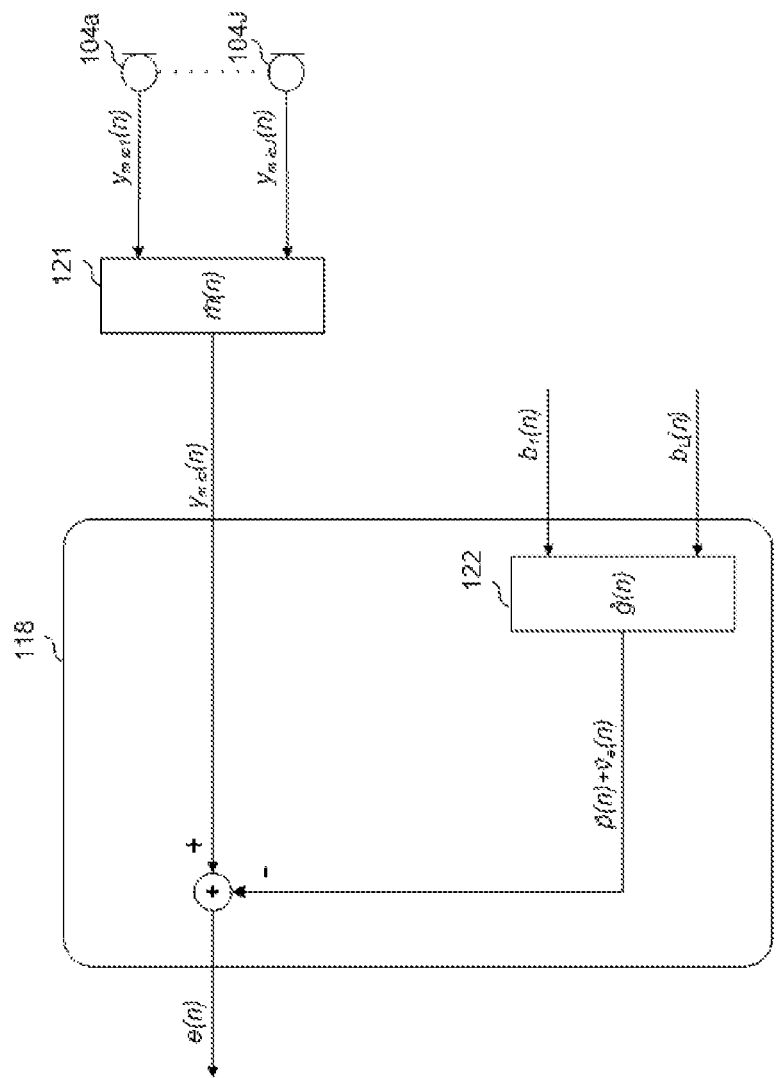
FIG. 1B depicts a partial schematic of an audio system including a microphone road-noise canceler for canceling road noise in a microphone signal, according to an example.
Figure 2:
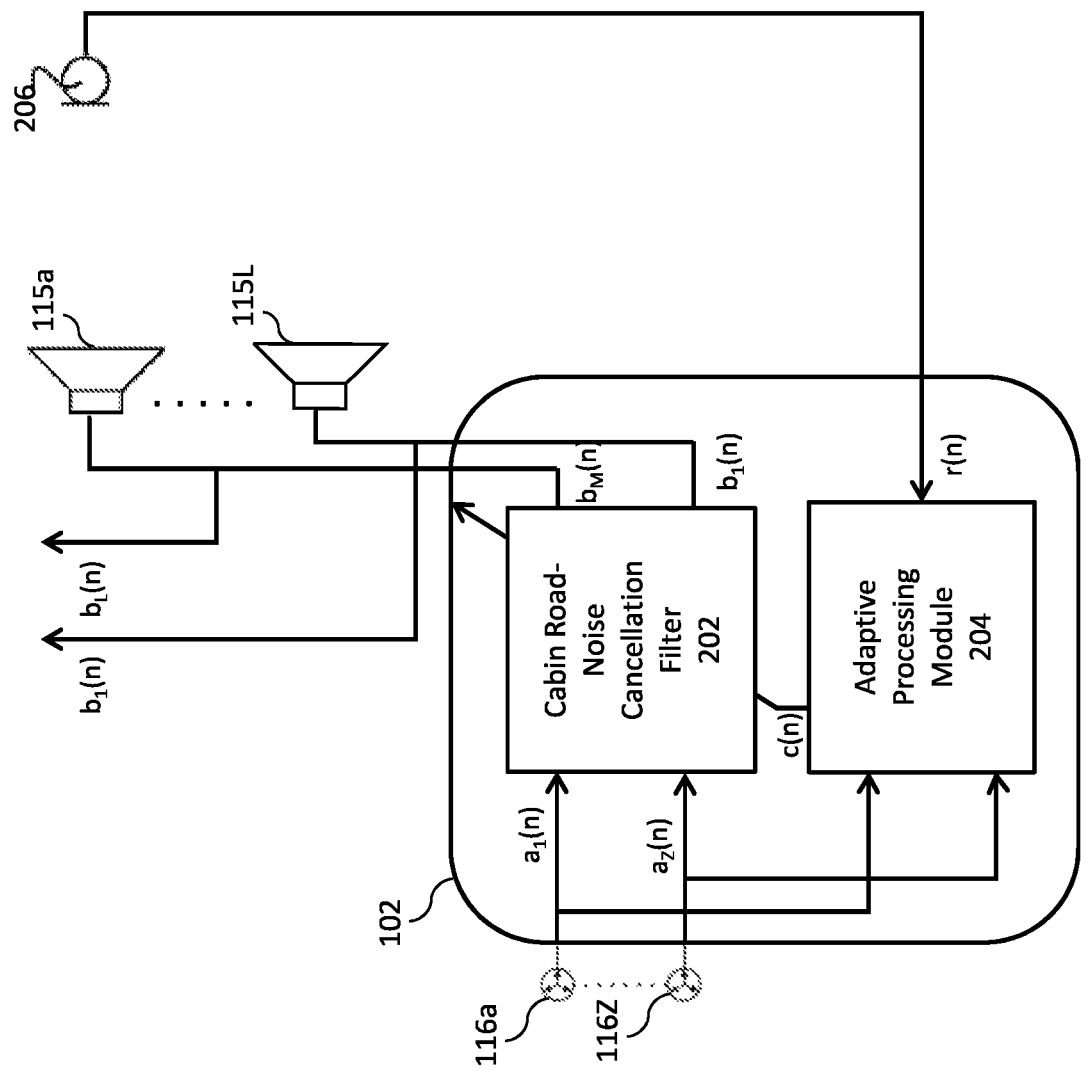
FIG. 2 depicts a schematic of a cabin road-noise cancellation system, according to an example.

Furthermore, in various alternative examples, microphone road-noise cancellation filter(s) 122 may be implemented as fixed, rather than adaptive filters, as shown in FIG. 1B. For example, road-noise cancellation filters 122 may be designed with transfer function $\hat{g}(n)$ which, as in the case of the adaptive filter implementation, is representative of how the road-noise cancellation signal p(n) is transformed as an acoustic road-noise cancellation signal p(n) and the road noise $v_a(n)$ propagates through the vehicle cabin to microphone.

In practice, the coefficients of the fixed microphone road-noise cancellation filter 122 (and consequently, estimated transfer function $\hat{g}(n)$) may be determined empirically, according to suitable methods (e.g., combinatorial signal processing), in order to minimize the road-noise component $v_a(n)$ and the road-noise cancellation signal component p(n) of the microphone signal $y_{mic}(n)$. For example, a vehicle, including a cabin road-noise cancellation system 102, and a microphone 106 may be driven over a variety of road surfaces and the signals from both recorded. From this data, a set of optimized coefficients may be determined that generate an estimated combined road-noise cancellation signal $\hat{p}(n)$ and road-noise signal $\hat{v}_a(n)$ that, on average, minimizes the road-noise cancellation signal component p(n) and the road-noise component $v_a(n)$ of the combined signal $y_{mic}(n)$, respectively, when subtracted from combined signal $y_{mic}(n)$.

As shown in FIG. 1B the microphone signals $y_{mic1 \ldots micJ}(n)$, output from microphones 106 may likewise be input to a fixed microphone filter 121 implementing a transfer function $\hat{m}(n)$. Microphone filter 121 may be configured to combine microphone signals $y_{mic1 \ldots micJ}(n)$ into a single microphone signal $y_{mic}(n)$, and to apply any other necessary or useful signal processing, such as projecting microphones 106 to a location near a user's mouth. To the extent that such signal processing is applied by microphone filter 121, the estimated transfer function $\hat{g}(n)$ is representative of how the road-noise cancellation signal p(n) is transformed as an acoustic road-noise cancellation signal p(n) and the road noise $v_a(n)$ propagates through the vehicle cabin to the projected location(s) of each microphones 106. Alternatively, or additionally, microphone filter 121 may steer beams toward sources of desired acoustic signals and/or away from noise sources, and may additionally or alternately steer nulls toward noise sources.

In practice, when using a microphone filter 121, the coefficients of microphone road-noise cancellation filter 122 may be empirically determined, in the same way as the above methods, to minimize road-noise component of $y_{mic}(n)$ to yield residual signal e(n). Although microphone filter 121 is shown in conjunction with FIG. 1B, it should be understood that a similar microphone filter may be implemented together with any example including a microphone described herein.

Figure 1C:
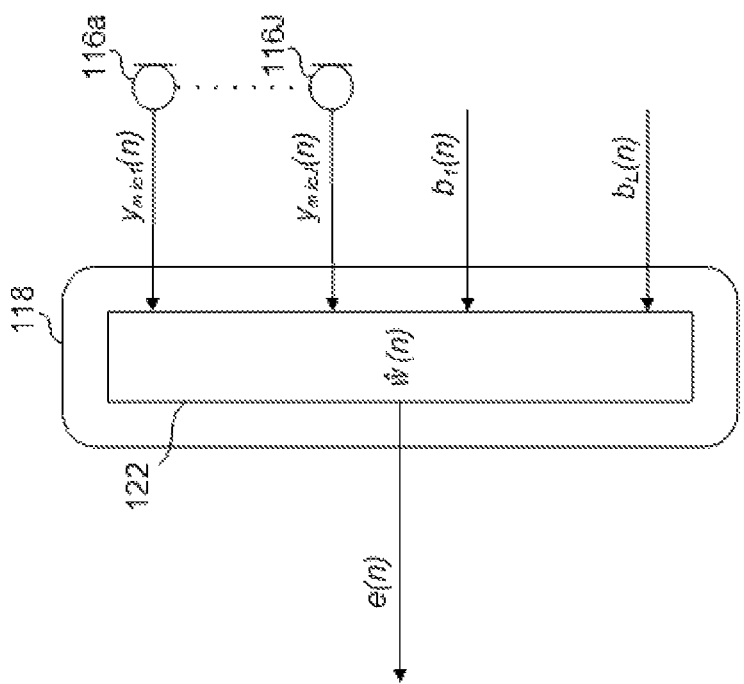
FIG. 1C depicts a partial schematic of an audio system including a microphone road-noise canceler for canceling road noise in a microphone signal, according to an example.

As shown in FIG. 1C, in an alternative example, microphone road-noise canceler 118 may be implemented as a fixed filter configured to receive the combined signal(s) $y_{mic}(n)$ from microphone(s) 106 and road-noise cancellation signal(s) b(n) from the cabin road-noise cancellation system 102, and to implement an estimated transfer function $\hat{w}(n)$ that, based on the relationships between the cabin road-noise cancellation system 102 and microphone(s) 106, is optimized to minimize the road-noise component $v_a(n)$ and the road-noise cancellation signal component p(n) in the microphone signal $y_{mic}(n)$ to generate the residual signal e(n). In this example, microphone road-noise canceler 118 does not subtract an estimated road-noise component $v_a(n)$ or an estimated road-noise cancellation signal component p(n) from $y_{mic}(n)$, but rather generates the residual signal e(n) directly with microphone road-noise cancellation filter 122 using inputs from microphone(s) 106 and the cabin road-noise cancellation filter 202. Microphone road-noise cancellation filter 122 may be empirically optimized to achieve the minimization of the road-noise component $v_a(n)$ and the road-noise cancellation signal component p(n) of the combined signal $y_{mic}(n)$, as in the above examples. For example, a vehicle, including both microphone(s) 106 and cabin road-noise cancellation system 102 may be driven over a variety of road surfaces and the signals from both recorded. From this data, a set of optimized coefficients may be determined, according to any suitable array processing method, that, on average, minimize the road-noise component $v_a(n)$ of the combined signal $y_{mic}(n)$.

In the above examples, multiple road-noise cancellation signal b(n) inputs to microphone road-noise canceler 118 are shown, it should be understood that, in various examples, only a single road-noise cancellation signal b(n) may be input to the microphone road-noise canceler 118. Furthermore, although multiple microphones are shown in FIGS. 1B and 1C, it should be understood that only a single microphone 106 may be used.

Furthermore, although echo canceler 120 is not shown in the example of FIGS. 1B and 1C, it should be understood that microphone road-noise canceler 118 may be implemented downstream or upstream of echo canceler 120 in various examples. Indeed, in various alternative examples where the echo canceler 120 and the road-noise canceler 118, are not part of the same multi-channel adaptive filter, the road-noise canceler 118 may be positioned to receive the estimated residual error signal e(n), rather than the combined signal $y_{mic}(n)$ from microphone 106. That is to say that the road-noise canceler 118 may be placed after the echo canceler 120 in the processing chain. This may improve the performance of the road-noise canceler 118, as echo signal will either not be present or will be minimally present in the error signal used by the adaptive road-noise cancellation filter 122 to adapt the filter coefficients.

In an example, road-noise canceler 118 and echo canceler 120 may be sub-banded. That is to say, the road-noise canceler 118 and echo canceler 120 may be duplicated, each duplicate being associated with a particular frequency band. The order of the road-noise canceler 118 and echo canceler 120 in the processing chain, for each sub-band, may be determined by the Signal-to-Noise Ratio (SNR) of the echo signal d(n) to the road-noise component $v_a$(n). For example, the combined signal $y_{mic}$(n) may be filtered, e.g., with a low-pass filter, to create a low-frequency sub-band, e.g., <400 Hz. At that frequency range, the power of the road noise signal $v_a$(n) will generally be higher than the power of the echo signal d(n) (i.e., the combined signal $y_{mic}$(n) will generally have an SNR of <0 dB), accordingly, the road-noise canceler 118 may be positioned before the echo canceler 120 (i.e., in the order shown in FIGS. 1 and 2) in the processing chain. If the echo canceler 120 were placed before the road-noise canceler 118 in this frequency band, the road-noise component $v_a$(n) would dominate the error signal received at the echo canceler 120, preventing the echo canceler 120 from adapting properly.

Similarly, the combined signal $y_{mic}$(n) may be filtered, e.g., with a bandpass filter, to a midrange of e.g., 400 Hz-1 kHz, in which the echo signal d(n) will greatly dominate the combined signal $y_{mic}$(n) (i.e., the combined signal $y_{mic}$(n) will generally have an SNR of >0 dB). In this frequency band, the echo canceler 120 may be positioned in the processing chain before the road-noise canceler 118. Otherwise, the power of the echo signal d(n) in the combined signal $y_{mic}$(n) would prevent road-noise canceler 118 from adapting properly.

Finally, the combined signal $y_{mic}$(n) may be filtered, e.g., with a highpass filter, to a high-frequency band of e.g., >1 kHz, in which the echo signal d(n) will greatly dominate the combined signal $y_{mic}$(n) (i.e., the combined signal $y_{mic}$(n) will generally have an SNR of >>0 dB). In this example, the road-noise canceler 118 may be omitted entirely, to avoid needless processing.

It should be understood that the above frequency bands are merely provided as examples, in order to illustrate the concept that the order of the road-noise canceler 118 and the echo canceler 120 in the processing chain may be determined by the SNR of a particular frequency band. More specifically, for frequency bands in which the SNR is generally <0 dB, the road-noise canceler 118 may be positioned before the echo canceler 120. For frequency bands in which the SNR is generally >0 dB, the road-noise canceler 118 may be positioned after the echo canceler 120. And for frequency bands in which the SNR is generally >>0 dB, the road-noise canceler 118 may be omitted entirely.

While the echo canceler 120 and the microphone road-noise canceler 118 cancel linear aspects of the combined microphone signal $y_{mic}$(n) correlated to the program content signals u(n), rapid changes and/or non-linearities in these signals prevent precise estimations, and a residual echo will thus remain in the residual signal e(n). The post filter subsystem 110 thus operates to suppress the residual echo component with spectral filtering to produce an improved estimated voice signal ŝ(n). Such post filters are generally known in the art, however a brief description of one example will be provided below.

As shown, the post filter subsystem 110 may include a coefficient calculator 128 and a post filter 130. The post filter 130 suppresses residual echo in the residual signal e(n) by, in some examples, reducing the spectral content of the residual signal e(n) by an amount related to the likely ratio of the residual echo signal power relative to the total signal power (e.g., speech and residual echo), by frequency bin. In one example, the post filter 130 may multiply each frequency bin (represented by index "k") of the residual signal e(n) by a filter coefficient $H_{pf}$(k), calculated by coefficient calculator 128, according to the following example equation:

$$H_{pf}(k) = \max\left\{1 - \beta \frac{\sum_{i=1}^{M}[|\Delta H_i(k)|^2 \cdot S_{u_i u_i}(k)]}{S_{ee}(k) + \rho}, H_{min}\right\} \quad (7)$$

where $\Delta H_i$(k) is a spectral mismatch, $S_{ee}$(k) is the power spectral density of the residual signal e(n), and $S_{u_i u_i}$ is the power spectral density of the program content signal u(n) on the i-th content channel. A minimum multiplier, $H_{min}$, is applied to every frequency bin, thereby ensuring that no frequency bin is multiplied by less than the minimum. It should be understood that multiplying by lower values is equivalent to greater attenuation. It should also be noted that in the example of equation (7), each frequency bin is at most multiplied by unity, but other examples may use different approaches to calculate filter coefficients. The β factor is a scaling or overestimation factor that may be used to adjust how aggressively the post filter subsystem 110 suppresses signal content, or in some examples may be effectively removed by being equal to unity. The ρ factor is a regularization factor to avoid division by zero.

The spectral mismatch $\Delta H_i$(k) represents the spectral mismatch between the actual echo path and the echo canceler 120. The actual echo path is, for example, the entire path taken by the program content signal u(n) from where it is provided to the echo canceler 120, through the soundstage rendering 114 the acoustic transducer(s) 104, the acoustic environment, and through the microphone(s) 106. The actual echo path may further include processing by the microphone 106 or other supporting components, such as array processing, for example. The spectral mismatch $\Delta H_i$(k) may be calculated as a ratio of the cross-power spectral density of program content signal u(n) on the i-th content channel and the residual signal e(n), $S_{u_i e}$, to the power spectral density of the program content signal u(n) on the i-th content channel, $S_{u_i u_i}$ $$\Delta H_i = \frac{S_{u_i e}}{S_{u_i u_i}} \quad (8)$$

In some examples, the power spectral densities used may be time-averaged or otherwise smoothed or low pass filtered to prevent sudden changes (e.g., rapid or significant changes) in the calculated spectral mismatch.

It should be understood that Eqs. (7) and (8) are generally related to the case in which reference signals are uncorrelated. If the reference signals are not necessarily uncorrelated (e.g., a left and right channel pair share some common content), the coefficient calculator 128 may calculate the filter coefficient $H_{pf}$(k) according to the following equation:

$$H_{pf}(k) = \max\left\{1 - \beta \frac{\Delta H^H(k) \cdot S_{uu}(k) \cdot \Delta H(k)}{S_{ee}(k) + \rho}, H_{min}\right\} \quad (9)$$

where $\Delta H^H$ represents the Hermitian of $\Delta H$, which is the complex conjugate transpose of $\Delta H$, and where $\Delta H$ is given by:

$$\Delta H = S_{uu}^{-1} S_{ue}. \tag{10}$$

$S_{uu}$ is the matrix of power spectral densities and cross power spectral densities of the program content channels. $\Delta H$ is the vector containing the spectral mismatch of all channels, and $S_{ue}$ is the vector containing the cross power spectral densities of each reference channel with the error signal.

Although the above equations have been provided for a post filter 130 configured to suppress residual echo e(n) correlated to multiple content channels 112, in alternate examples, the post filter 130 may be configured to suppress the residual echo from only one content channel 112.

In various examples, the post filter subsystem 110 may be configured to operate in the frequency domain or the time domain. Accordingly, use of the term "filter coefficient" is not intended to limit the post filter 130 to operation in the time domain. The terms "filter coefficients," or other comparable terms, may refer to any set of values applied to or incorporated into a filter to cause a desired response or a desired transfer function. In certain examples, the post filter 130 may be a digital frequency domain filter that operates on a digital version of the estimated voice signal to multiply signal content within a number of individual frequency bins, by distinct values generally less than or equal to unity. The set of distinct values may be deemed filter coefficients.

Figure 1D:
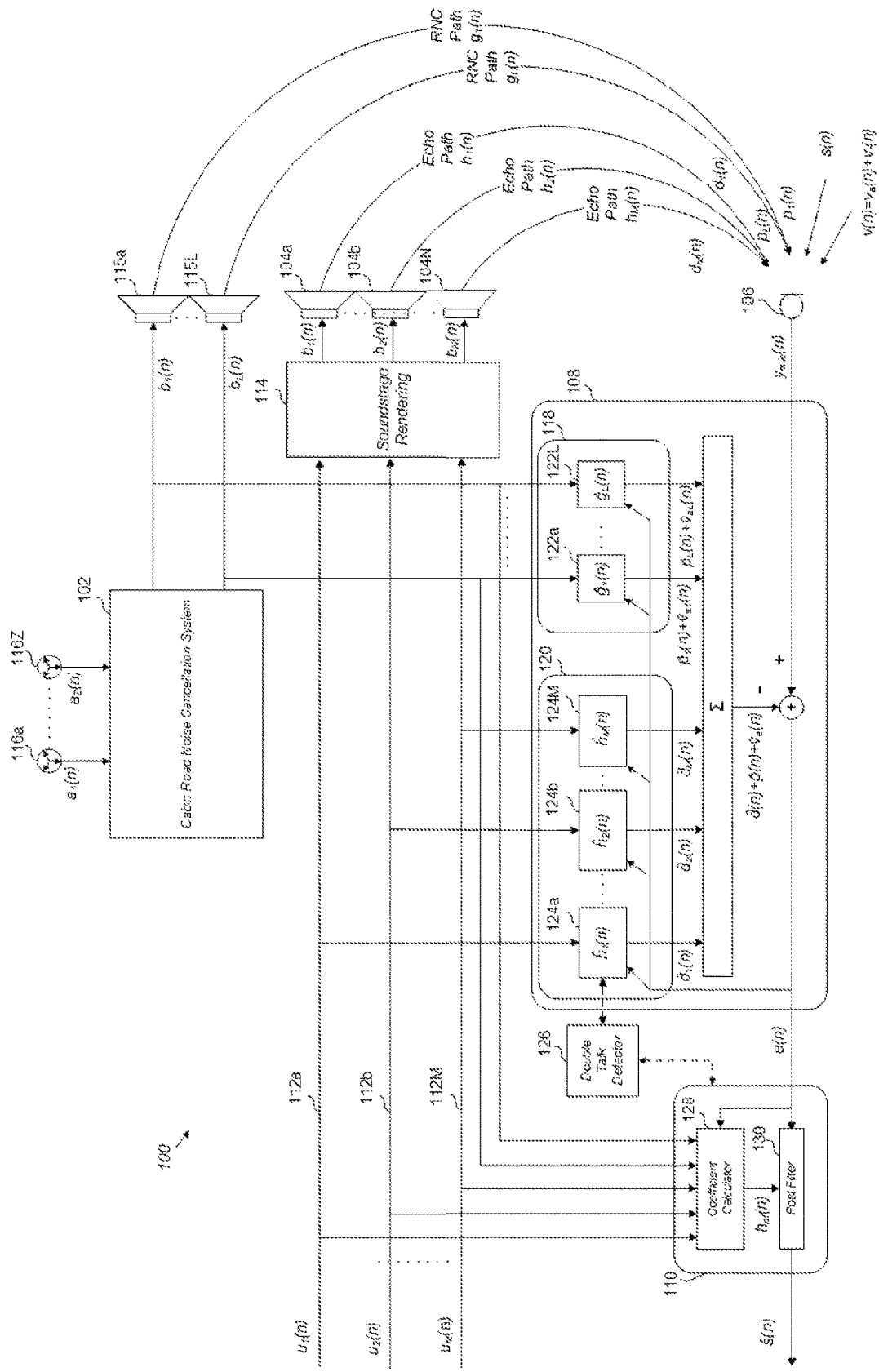
FIG. 1D depicts a schematic of an audio system including a microphone road-noise canceler for canceling road noise in a microphone signal and a post filter receiving road-noise cancellation signals as reference signals, according to an example.

As shown in FIG. 1D, the post filter subsystem 110 may be further configured to receive the road-noise cancellation signals b(n) as reference signals, in order to suppress the residual road noise present in the residual signal e(n), in addition to suppressing the residual echo in the residual signal e(n). One of ordinary skill in the art, in conjunction with reviewing this disclosure, will understand how to modify the post filter subsystem 110, and the equations described above, to suppress the residual road noise in the residual signal e(n).

Aside from combined post filter subsystem 110, modified to suppress road noise in the residual signal e(n), the structure and components of FIG. 1D functions largely the same as described in connection with FIG. 1, and thus do not require additional explanation. It should, however, be understood that in various alternative examples, the modified post filter subsystem 110 may be included in an audio system that does not feature the combined multichannel adaptive filter 108. For example, the modified post filter subsystem 110 may be included together with audio systems of FIGS. 1B and 1C.

The output of audio system 100 or any variations thereof (e.g., estimated voice signal ŝ(n)) may be provided to another subsystem or device for various applications and/or processing. Indeed, the audio system 100 output may be provided for any application in which a noise-reduced voice signal is useful, including, for example, telephonic communication (e.g., providing the output to a far-end recipient via a cellular connection), virtual personal assistants, speech-to-text applications, voice recognition (e.g., identification), or audio recordings.

The echo canceler 120 and the road-noise canceler 118 (to the extent that they apply adaptive filters), and the post filter subsystem 110 may be configured to calculate the adaptive filter coefficients and the post filter 130 coefficients, respectively, only during periods when a double talk condition is not detected, e.g., by a double talk detector 126. As described above, when a user is speaking within the acoustic environment of the audio system 100, the combined microphone signal $y_{mic}(n)$ includes a component that is the user's speech. In this case, the combined signal $y_{mic}(n)$ is not representative of only the echo from the acoustic transducer(s) 104, and the residual signal e(n) is not representative of the residual echo, e.g., the mismatch of the echo canceler 120 relative to the actual echo path, because the user is speaking. Accordingly, the double talk detector 126 operates to indicate when double talk is detected, new coefficients may not be calculated during this period, and the coefficients in effect at the start or just prior to the user talking may be used while the user is talking. The double talk detector 126 may be any suitable system, component, algorithm, or combination thereof.

FIG. 2 shows an example of cabin road-noise cancellation system 102 comprising cabin road-noise cancellation filter 202 configured to receive the accelerometer signal(s) a(n) and to generate road-noise cancellation signal b(n). Road-noise cancellation signal b(n), as described above, is input to acoustic transducer(s) 115 where it is transduced into the acoustic noise-cancellation signal that destructively interferes with the undesired sound in the predefined cancellation zone. Cabin road-noise cancellation filter 202 may be implemented as any suitable linear filter, such as a multi-input multi-output (MIMO) finite impulse response (FIR) filter. Cabin road-noise cancellation filter 202 employs a set of coefficients which define the road-noise cancellation signal b(n) and which may be adjusted to adapt to changing behavior of the nonlinear vehicle response to road input.

The adjustments to the coefficients may be performed by an adaptive processing module 204, which receives as inputs the error sensor signal r(n) and the accelerometer signals a(n) and, using those inputs, generates a filter update signal c(n). The error signal is received from error sensor 206, which, typically, is a microphone positioned to detect the performance of the acoustic road-noise cancellation signal p(n). (In an example, error sensor 206 may be microphone 106.) The filter update signal c(n) is an update to the filter coefficients implemented in cabin road-noise cancellation filter 202. The noise-cancellation signal b(n) produced by the updated cabin road-noise cancellation filter 202 will minimize error sensor signal r(n), and, consequently, the undesired noise in the cancellation zone. The adaptive processing module 204 may update the coefficients of the cabin road-noise cancellation filter 202 according to an adaptive algorithm. The adaptive algorithm may use any of various techniques to determine the filter coefficients and to update, or change, the filter coefficients to improve performance of the cabin road-noise cancellation filter 202. Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms.

It should be understood that, in this disclosure, a capital letter used as an identifier or as a subscript represents any number of the structure or signal with which the subscript or identifier is used. Thus, channel 112M represents the notion that any number of channels 112 may be implemented in various examples. Indeed, in some examples, only one channel 112 may be implemented for one program content signal. Likewise, program content signal $u_M(n)$ represents the notion that any number of program content signals may be used. To the extent that different letters are used as subscripts, it is generally understood that those signals and structures may differ in number from other structures having different letters. Thus, there may be a different number of soundstage rendering outputs $b_N(n)$ than program content signals $u_M(n)$. It should, however, be understood that, in some examples, the same number of soundstage rendering outputs $b_N(n)$ and program content channels $u_M(n)$ may be used. Finally, it should be understood that, the same letter used for different signals or structures, e.g., program content signals $u_M(n)$ and estimated echo signals $\hat{d}_M(n)$, represents the general case in which there exists the same number of a particular signal or structure. Thus, in the general case, there will be the same number of estimated echo signals $\hat{d}_M(n)$ as program content signals $u_M(n)$ when the program content signals $u(n)$ are used as a reference signal for echo canceler. The general case, however, should not be deemed limiting. A person of ordinary skill in the art will understand, in conjunction with a review of this disclosure, that, in certain examples, a different number of such signals or structures may be used. Thus, in certain examples (e.g., where certain program content signals $u(n)$ are summed together to form a single reference for a single echo-cancellation filter 124) there may be a different number of estimated echo signals $\hat{d}_M(n)$ than program content signals $u_M(n)$.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An audio system, comprising:
    an accelerometer positioned to produce an accelerometer signal representative of road noise within a vehicle cabin;
    a microphone operably positioned within the vehicle cabin to receive the road noise and to produce a microphone signal having a road-noise component; and
    a cabin road-noise canceler, comprising a cabin road-noise cancellation filter, configured to receive the accelerometer signal and to produce a cabin road-noise cancellation signal, wherein the cabin road-noise cancellation signal is provided to an acoustic transducer for transduction of an acoustic road-noise cancellation signal, the acoustic road-noise cancellation signal minimizing the road noise within at least one cancellation zone in the vehicle cabin;
    a microphone road-noise canceler, comprising a microphone road-noise cancellation filter, configured to receive the cabin road-noise cancellation signal and the microphone signal and to minimize the road-noise component of the microphone signal according to the cabin road-noise cancellation signal, to produce an estimated microphone signal in which the road-noise component is reduced.

2. The audio system of claim 1, wherein the microphone road-noise cancellation filter is configured to provide an estimated road-noise signal, based on the cabin road-noise cancellation signal, wherein the microphone road-noise canceler is configured to subtract the estimated road-noise signal from the microphone signal, such that the road-noise component of the microphone signal is minimized.

3. The audio system of claim 2, wherein the microphone road-noise cancellation filter is a fixed filter.

4. The audio system of claim 2, wherein the microphone road-noise cancellation filter is an adaptive filter, wherein a plurality of coefficients of the adaptive filter are adapted to according to an error signal.

5. The audio system of claim 1, further comprising an echo-cancellation filter configured to minimize an echo component of the microphone signal, resulting from an acoustic production of at least one acoustic transducer disposed within the vehicle cabin, to produce a residual signal.

6. The audio system of claim 4, wherein the adaptive filter is included in a multichannel adaptive filter further comprising an echo-cancellation filter configured to minimize an echo component of the microphone signal resulting from an acoustic production of at least one acoustic transducer disposed within the vehicle cabin.

7. The audio system of claim 1, wherein microphone road-noise cancellation filter is configured to receive the microphone signal and the cabin road-noise cancellation signal, the microphone road-noise cancellation filter being optimized to minimize the road-noise component of the microphone signal according to the cabin road-noise cancellation signal and the microphone signal.

8. A method for canceling road noise in a microphone signal, comprising:
- receiving from a cabin road-noise canceler a cabin road-noise cancellation signal configured to minimize road noise within at least one cancellation zone in a vehicle cabin;
- receiving, from a microphone operably positioned within the vehicle cabin, a microphone signal having a road-noise component; and
- minimizing, with a microphone road-noise cancellation filter, the road-noise component of the microphone signal according to the cabin road-noise cancellation signal, to produce an estimated microphone signal.

9. The method of claim 8, wherein the step of minimizing comprises:
- generating, with the microphone road-noise cancellation filter, an estimated road-noise signal, based on the cabin road-noise cancellation signal,
- subtracting the estimated road-noise signal from the microphone signal, such that the road-noise component of the microphone signal is minimized.

10. The method of claim 9, wherein the microphone road-noise cancellation filter is a fixed filter.

11. The method of claim 9, wherein the microphone road-noise cancellation filter is an adaptive filter, wherein a plurality of coefficients of the adaptive filter are adapted to according to an error signal.

12. The method of claim 8, further comprising minimizing, with an echo-cancellation filter, an echo component of the microphone signal, resulting from an acoustic production of at least one acoustic transducer disposed within the vehicle cabin, to produce a residual signal.

13. The method of claim 11, further comprising minimizing, with an echo-cancellation filter being included together with the adaptive filter in a multichannel adaptive filter, an echo component of the microphone signal resulting from an acoustic production of at least one acoustic transducer disposed within the vehicle cabin.

14. The method of claim 8, wherein the step of minimizing the road-noise component of the microphone signal is performed according to both the road-noise signal and the microphone signal.

15. A non-transitory storage medium comprising program code that, when executed by a processor, performs the steps of:
- receiving from a cabin road-noise canceler a cabin road-noise cancellation signal configured to minimize road noise within at least one cancellation zone in a vehicle cabin;
- receiving, from a microphone operably positioned within the vehicle cabin, a microphone signal having a road-noise component; and
- minimizing, with a microphone road-noise cancellation filter, the road-noise component of the microphone signal according to the cabin road-noise cancellation signal, to produce an estimated microphone signal in which the road-noise component is reduced.

16. The program code stored on the non-transitory storage medium of claim 15, wherein the step of minimizing comprises:
- generating, with the microphone road-noise cancellation filter, an estimated road-noise signal, based on the cabin road-noise cancellation signal,
- subtracting the estimated road-noise signal from the microphone signal, such that the road-noise component of the microphone signal is minimized.

17. The program code stored on the non-transitory storage medium of claim 16, wherein the microphone road-noise cancellation filter is a fixed filter.

18. The program code stored on the non-transitory storage medium of claim 16, wherein the microphone road-noise cancellation filter is an adaptive filter, wherein a plurality of coefficients of the adaptive filter are adapted according to an error signal.

19. The program code stored on the non-transitory storage medium of claim 15, further comprising minimizing, with an echo-cancellation filter, an echo component of the microphone signal, resulting from an acoustic production of at least one acoustic transducer disposed within the vehicle cabin, to produce a residual signal.

20. The program code stored on the non-transitory storage medium of claim 18, further comprising minimizing, with an echo-cancellation filter being included together with the adaptive filter in a multichannel adaptive filter, an echo component of the microphone signal resulting from an acoustic production of at least one acoustic transducer disposed within the vehicle cabin.

* * * * *